US007702441B2

(12) United States Patent
Geborek et al.

(10) Patent No.: US 7,702,441 B2
(45) Date of Patent: Apr. 20, 2010

(54) SAFETY LOGIC FOR VEHICLE ROLLOVER DETECTION SYSTEMS AND A METHOD FOR DETECTING NEAR ROLLOVER SITUATIONS

(75) Inventors: Mariusz Geborek, Krakow (PL); Aleksandra Urbanek, Radzionkow (PL); Daniel Sygnarowicz, Wojnicz (PL)

(73) Assignee: Delphi Technologies, Inc., Troy, MI (US)

( * ) Notice: Subject to any disclaimer, the term of this patent is extended or adjusted under 35 U.S.C. 154(b) by 649 days.

(21) Appl. No.: 11/059,227

(22) Filed: Feb. 16, 2005

(65) Prior Publication Data
US 2005/0187687 A1     Aug. 25, 2005

(30) Foreign Application Priority Data
Feb. 23, 2004   (PL) ..................................... 365449

(51) Int. Cl.
*B60R 22/00* (2006.01)
(52) U.S. Cl. ............... 701/45; 701/1; 701/33; 701/36; 701/69; 180/271; 180/272; 180/273; 180/274; 180/275; 180/276; 180/277; 180/278; 180/279; 180/280; 180/281; 180/282; 180/283; 180/284; 180/285; 180/286; 180/287; 180/288; 180/289; 180/290
(58) Field of Classification Search ............ 701/1, 701/33, 36–40, 45–48, 69, 70–92; 180/271–290; 280/5.5, 5.501–5.524
See application file for complete search history.

(56) References Cited
U.S. PATENT DOCUMENTS
6,002,974 A * 12/1999 Schiffmann .................. 701/36

| 6,141,604 | A | 10/2000 | Mattes et al. | |
| 6,192,305 | B1 * | 2/2001 | Schiffmann | .................. 701/45 |
| 6,424,897 | B1 | 7/2002 | Mattes et al. | |
| 6,433,681 | B1 * | 8/2002 | Foo et al. | ..................... 340/440 |
| 6,535,800 | B2 | 3/2003 | Wallner | |
| 6,594,570 | B2 * | 7/2003 | Nagao et al. | .................. 701/45 |
| 6,600,414 | B2 | 7/2003 | Foo et al. | |
| 6,654,674 | B2 * | 11/2003 | Lu et al. | ........................ 701/36 |
| 2002/0075140 | A1 | 6/2002 | Yeh et al. | |
| 2002/0075143 | A1 * | 6/2002 | Foo et al. | ..................... 340/440 |
| 2002/0087235 | A1 * | 7/2002 | Aga et al. | ....................... 701/1 |
| 2002/0099486 | A1 * | 7/2002 | Nagao et al. | .................. 701/45 |

FOREIGN PATENT DOCUMENTS
DE     196 09 176     9/1997
DE     197 44 083     4/1999

OTHER PUBLICATIONS
Copy of EP Search Report dated Jun. 7, 2005.
* cited by examiner

*Primary Examiner*—Khoi Tran
*Assistant Examiner*—Bhavesh V Amin
(74) *Attorney, Agent, or Firm*—Thomas N. Twomey

(57) ABSTRACT

A safety logic for vehicle rollover detection systems comprising a main rollover detection logic and at least one protection device for the occupant or occupants of the vehicle, including a vehicle lateral acceleration sensor (11), which generates an output signal indicating a near rollover event, when a lateral acceleration of a vehicle exceeds the first predefined threshold value (15) or, when a lateral acceleration of vehicle exceeds the second predefined threshold value (16) that is lower than the first predefined threshold value (15) and simultaneously at least one additional safety logic activation signal is present (1, 1', 1", 1''').

14 Claims, 4 Drawing Sheets

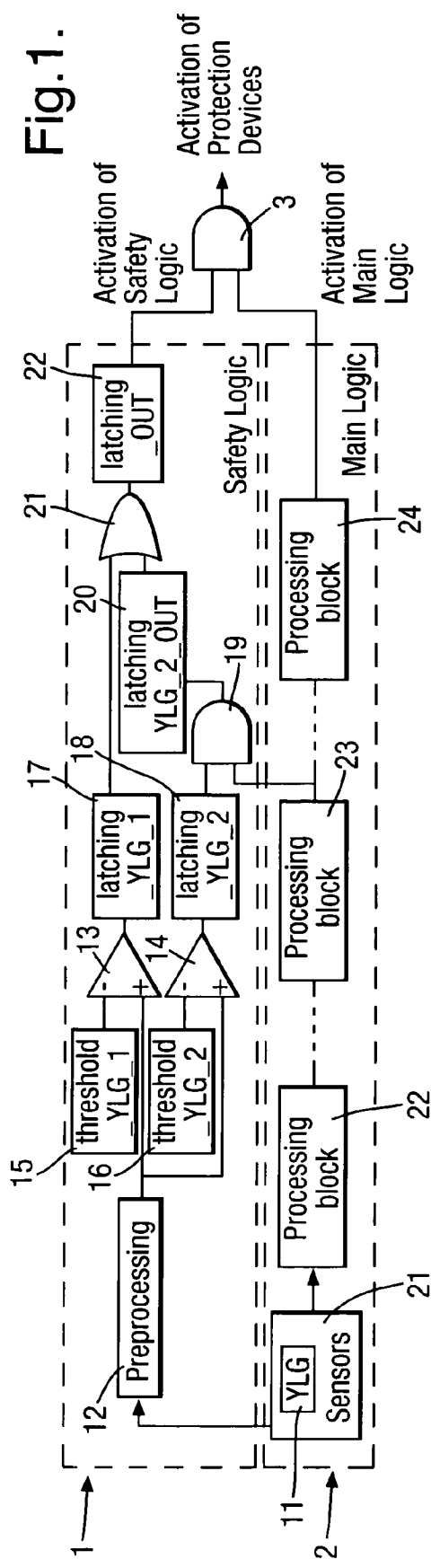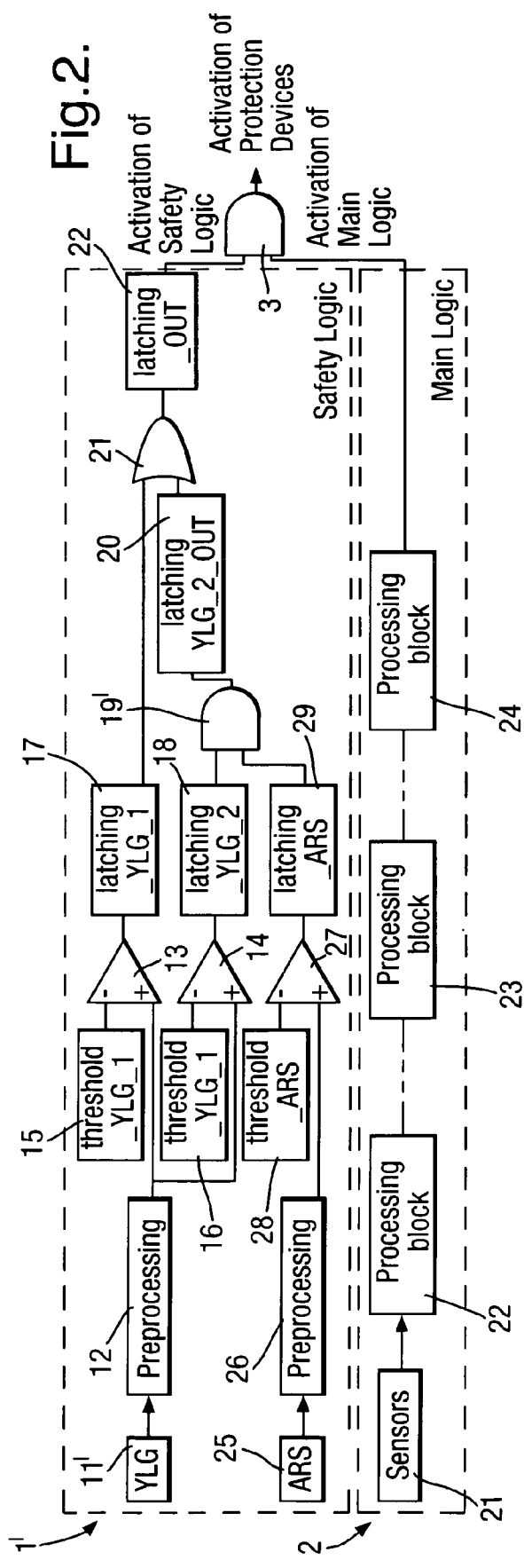

SAFETY LOGIC FOR VEHICLE ROLLOVER DETECTION SYSTEMS AND A METHOD FOR DETECTING NEAR ROLLOVER SITUATIONS

TECHNICAL FIELD

The present invention relates to a safety logic for vehicle rollover detection systems comprising a main rollover detection logic and at least one protection device for the occupant or occupants of the vehicle. The present invention relates also to a method of determining dangerous situations that with high probability may lead to a rollover of a vehicle.

BACKGROUND OF THE INVENTION

The purpose of the rollover detection system is activation of protection devices such as seat belts pretensioners, pop-up roll bars or air bags, especially air bags protecting occupants' heads during rollover accident.

In many systems for detecting dangerous situations, in particular in rollover detection systems there are two paths of signal processing: a main path being the main logic and an independent arming path, being a separate safety logic. An essential purpose of safety logic is to decrease the probability of inadvertent deployment in an event of failure or error in main rollover detection logic, wherein an activation signal of the main logic is summed with an activation signal of the safety logic by means of AND function at the last stage of processing, directly before an activation of protection devices.

Examples of logics of this kind are disclosed in U.S. Pat. Nos. 6,535,800, 6,600,414 or WIPO publication WO 03/010034. Publication WO 03/010034 discloses a rollover determination system comprising a first roll rate sensor, a lateral acceleration sensor and a main controller that determines, whether there is a possibility of rollover of the vehicle on the basis of the roll rate and lateral acceleration of the vehicle. The system comprises also a safety logic for confirming a rollover accident, whose output is summed with an output signal of a main rollover detection logic by means of AND gate.

SUMMARY OF THE INVENTION

The aim of the present invention is to provide a safety logic for vehicle rollover detection systems, which would generate an activation signal during a vehicle rollover or near rollover event. Such a logic should also feature a resistance for mechanical vibrations, simple construction, low manufacturing costs and could be used as an additional safety solution for rollover detection systems without their considerable modifications.

The aim of the present invention is also to provide a simple method for detecting dangerous situations that may end up with a rollover of a vehicle.

According to the present invention there is provided a safety logic for vehicle rollover detection systems comprising a main rollover detection logic and at least one protection device for the occupant or occupants of the vehicle, which according to the invention is connected with the vehicle lateral acceleration sensor and generates the output signal indicating a near rollover event, when a lateral acceleration of a vehicle exceeds the first predefined threshold value or, when a lateral acceleration of vehicle exceeds the second predefined threshold value that is lower than the first predefined threshold value and simultaneously at least one additional safety logic activation signal is present.

An activation of the safety logic may be used, for example, to active repeatable protection devices, that activate in potentially dangerous situation and return to its steady state, shall it pass, such as e.g. mechanical resetable seatbelts pretensioners.

It is especially advantageous if the additional safety logic activation signal, according to the present invention, is a signal delivered by the main logic.

Thanks to application of main logic signals in operation of the safety logic, additional sensors are not required. Even during failure of the main logic, the safety logic shall be substantially inactive during normal driving conditions not threatening a rollover (for example driving straight, gentle driving with low speed). An additional activation signal may occur in the main logic, at an intermediate stage of signal processing, as a result of main logic algorithm activity, or may be also generated by the main logic solely for the needs of the safety logic, using a simple logic.

Therefore it is advantageous if the additional signal of activation of the safety logic is generated by the main logic, when a roll rate of vehicle exceeds the predefined threshold value.

In this case, it is also advantageous if beside of exceeding the predefined threshold value by a roll rate of vehicle, to generate additional activation signal, exceeding linear velocity of vehicle above the predefined threshold value is required.

An additional activation signal of the safety logic may also be generated by the main logic, only if a roll angle of vehicle exceeds a predefined threshold value Moreover, it is advantageous if the safety logic, according to the present invention, has a lateral acceleration sensor, which signal is not used by the main logic.

The safety logic according to the present invention, may also preferably contain a vehicle roll rate sensor, and an additional activation signal of the safety logic shall occur when a signal of the vehicle roll rate sensor exceeds the predefined threshold value.

Obviously in this solution there may occur two additional activation signals: the first from vehicle roll rate sensor of the safety logic, and the second from the main logic.

The safety logic according to the present invention is relatively simple construction, therefore features a high probability of activation during dangerous situations, that not necessarily need to end up with a vehicle rollover. Therefore to activate protection devices a main logic and the safety logic activation is necessary.

Owing to this an appropriate protection device e.g. air-bags shall be deployed only when both logics are activated.

It is advantageous if at least one activation signal is sustained for a predetermined period.

It is also advantageous if at least one sensor input value is pre-processed.

A pre-processing preferably involves at least signal scaling, removing a sensor drift and/or filtering a signal.

In particular, according to the present invention there is provided a safety logic for vehicle rollover detection systems comprising a main rollover detection logic and at least one protection devices for the occupant or occupants of the vehicle, where the main logic activation signal is summed with the safety logic activation signal by means of an AND gate at the last stage of pre-processing, directly before activation of protection devices, where, at least one additional activation signal, generated by the main logic at an intermediate stage of pre-processing path, is necessary to activate the safety logic.

According to the present invention there is also provided a method of determining vehicle near rollover situations, characterized in that, it comprises a measuring of lateral acceleration of a vehicle and generating an output activation signal that determines near rollover situation, if a lateral acceleration of vehicle exceeds the first predefined threshold value or, a lateral acceleration of vehicle exceeds second predefined threshold value that is lower than the first predefined threshold value and at least one additional activation signal is present.

The method according to the present invention may preferably include measuring a roll rate of vehicle, and an additional activation signal occurs, when a roll rate of vehicle exceeds the predefined threshold value.

The method according to the present invention may also preferably include measuring a linear velocity of vehicle, and an additional activation signal occurs, when a linear speed of vehicle exceeds the predefined threshold value.

The method according to the present invention may also include measuring a roll angle of vehicle, and an additional activation signal shall occur, when a roll angle of vehicle exceeds the predefined threshold value, wherein a roll angle may be calculated on the basis of vehicle roll rate.

BRIEF DESCRIPTION OF THE DRAWINGS

The safety logic according to the present invention is presented below by way of examples of preferred embodiments with reference to figures of the drawing in which:

FIG. 1 is a block and circuit diagram of an embodiment of a rollover detection system comprising the logic according to the present invention FIG. 2 is a block and circuit diagram of another embodiment of a rollover detection system.

DESCRIPTION OF THE PREFERRED EMBODIMENT

Figure 3:
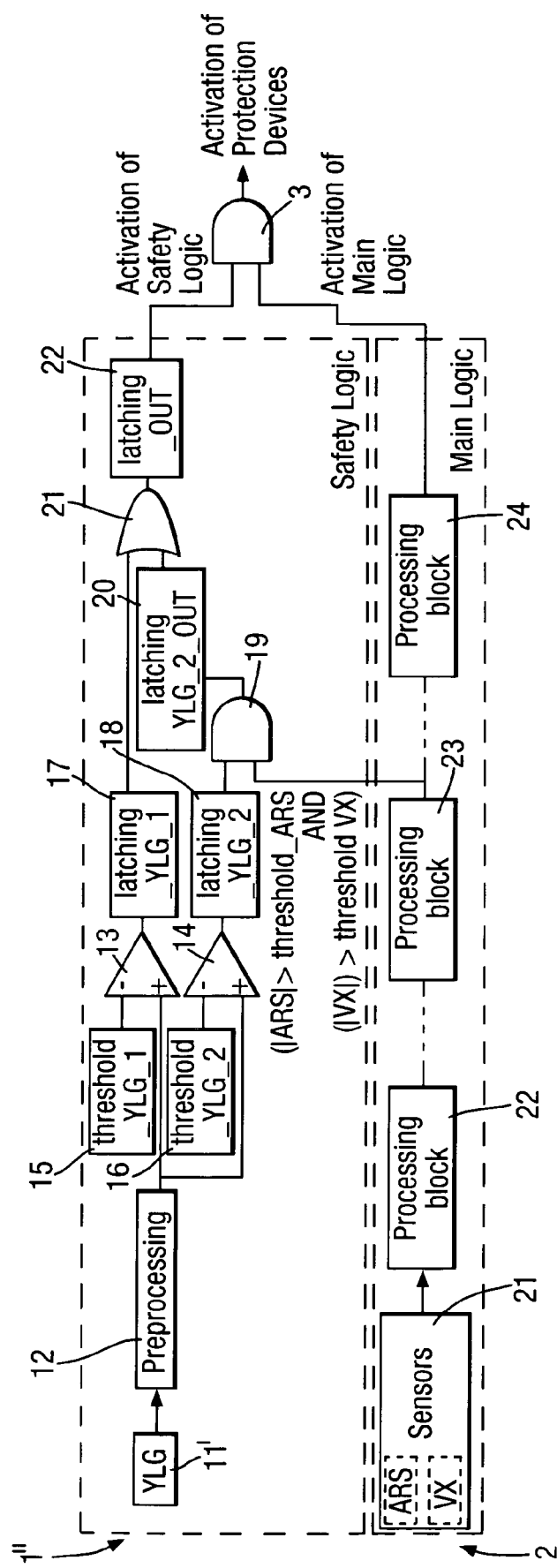
FIG. 3 is a block and circuit diagram of further embodiment of a rollover detection system.

As shown on the diagram in FIG. 1, in the rollover detection system there are two logics: the safety logic 1 and the main logic 2.

The main logic 2 collects signals from the block of sensors 21, whose element is, among others, a vehicle lateral low acceleration sensor (YLG) 11, fixed in vehicle in such a way that its working axis is perpendicular to the longitudinal and vertical axis of vehicle. This sensor may be, for example, sensor of the type ADXL 202 made by Analog Devices, Inc., USA. Sensor of this type is capable of detection of accelerations in the range from 0 g to about ±2 g.

The input signals of the main logic 2 are subsequently processed by serially connected processing blocks 22, 23, 24 and, in accordance with the working algorithm of the main logic, in the case of rollover of vehicle the activation signal occurs at the input of the AND gate 3.

A signal of the sensor 11 is the first input signal of the safety logic 1 and is processed by pre-processing module 12, where signal scaling, removing a sensor drift and broad-band filtering takes place to remove a noise of the sensor before digital sampling. Pre-processing modules discussed below realize functions similar to that of the module 12.

An absolute value of the output signal of the module 12 is subsequently compared in comparators 13 and 14 with predefined threshold values 15 ("threshold_YLG_1") and 16 ("threshold_YLG_2"). The right choice of these and others parameters depends on a lot of factors, like for example a wheel track, a mass, a position of centre of gravity, or a moment of inertia of vehicle.

At the outputs of the comparators 13 and 14 the TRUE signal of activation occurs, if a filtered signal of the sensor 11 exceeds the predefined threshold values 15 or 16. Next these signals are sustained for a predetermined periods "latching_YLG_1" and "latching_YLG_2" in the modules 17 and 18.

The lateral acceleration of vehicle within the range from 1.0 to 1.8 g, that is value exceeding the first threshold value "threshold_YLG_1", unlikely occurs during normal driving conditions. It may occur during aggressive driving or side collision, thus an activation of the comparator 13 leads to direct activation of the safety logic 1. In this case an activation signal is sent by OR gate 21, sustained in module 22 for 0.2 s ("latching_OUT") and becomes the first input of an AND gate 3, the activation of which (TRUE signal) leads to an activation of the protection devices.

Since a lateral acceleration of vehicle ranging from 0.1 to about 0.8 g, that is value exceeding the second threshold value "threshold_YLG_2", may occur during normal driving conditions, for example during driving a sharp turns, aggressive driving, or considerable bank of vehicle, an additional activation signal is necessary to activate the safety logic 1.

In system shown in FIG. 1, an additional activation signal is delivered from the main logic. At intermediate stage of processing of main logic 2 signals, after processing block 23, an activation signal is delivered also at the input of the AND gate 19, the second input of which is the activation signal of comparator 14 which is sustained by module 18 for a predetermined period "latching_YLG_2". An activation signal of the gate 19 is sustained for a predetermined period "latching_YLG_2_OUT" in module 20 and it is the second input of the OR gate 21.

Consequently, to active occupant protection devices the following condition is required:

a) an activation of the main logic 2 and a lateral acceleration value exceeding "threshold_YLG_1" 15 or b) an activation of the main logic 2 and a lateral acceleration value exceeding "threshold_YLG_2" 16 (lower than "threshold_YLG_1"), simultaneously with indirect activation of the main logic 2.

An indirect activation of the main logic depends on the working algorithm of the main logic 2 and in particular it may mean in particular exceeding a roll rate or a roll angle of the vehicle, or a linear speed of the vehicle above predefined threshold value, wherein roll angle of vehicle may be calculated by the main logic on the basis of a roll rate of vehicle by means of integration of roll rate.

In other embodiments of the safety logics presented below, the reference numerals of the elements performing the same functions correspond to those in FIG. 1.

The input of the safety logic 1', shown in FIG. 2 is separated from the input of the main logic 2. The safety logic 1' has an independent vehicle lateral low acceleration sensor 11' and an independent vehicle roll rate sensor (ARS) 25. The signal of the sensor 25 is processed in the module 26 and compared in the comparator 27 with a predefined threshold value ("threshold_ARS") 28, on the output of which an activation signal will appear, if the threshold value 28 is exceeded. The activation signal of the comparator 27 is sustained in the module 29 for 0.1 s ("latching_ARS") and it is the second input of the gate 19'.

As it is shown in the embodiment, an additional activation signal is generated by the safety logic 1' and an indirect coupling of both logics is not present.

The Table 1 below shows preferred ranges of values of parameters of calibration of the safety logic according to the present invention and their example values for the logic 1' shown in FIG. 2.

TABLE 1

| Calibration parameter | Preferred range | Example value |
| --- | --- | --- |
| threshold_YLG_1 | from 1.0 to 1.8 [g] | 1.3 g |
| threshold_YLG_2 | from 0.1 to 0.8 [g] | 0.3 g |
| threshold_ARS | from 15 to 40 [°/s] | 30 °/s |
| latching_YLG_1 | from 0.1 to 0.5 [s] | 0.1 s |
| latching_YLG_2 | from 0.1 to 0.5 [s] | 0.25 s |
| latching_ARS | from 0.1 to 0.5 [s] | 0.1 s |
| latching_YLG_2_OUT | from 0.1 to 0.5 [s] | 0.2 s |
| latching_OUT | from 0.1 to 0.5 [s] | 0.2 s |

FIG. 3 shows another embodiment of the safety logic 1" according to the present invention in the rollover detection system. This logic differs from the logic in FIG. 1 by the presence of the sensor 11' and the type of condition of indirect activation of the main logic, which in this case occurs, when a roll rate (ARS) as well as a linear velocity (VX) of vehicle exceed threshold values predefined in the main system.

Figure 4:
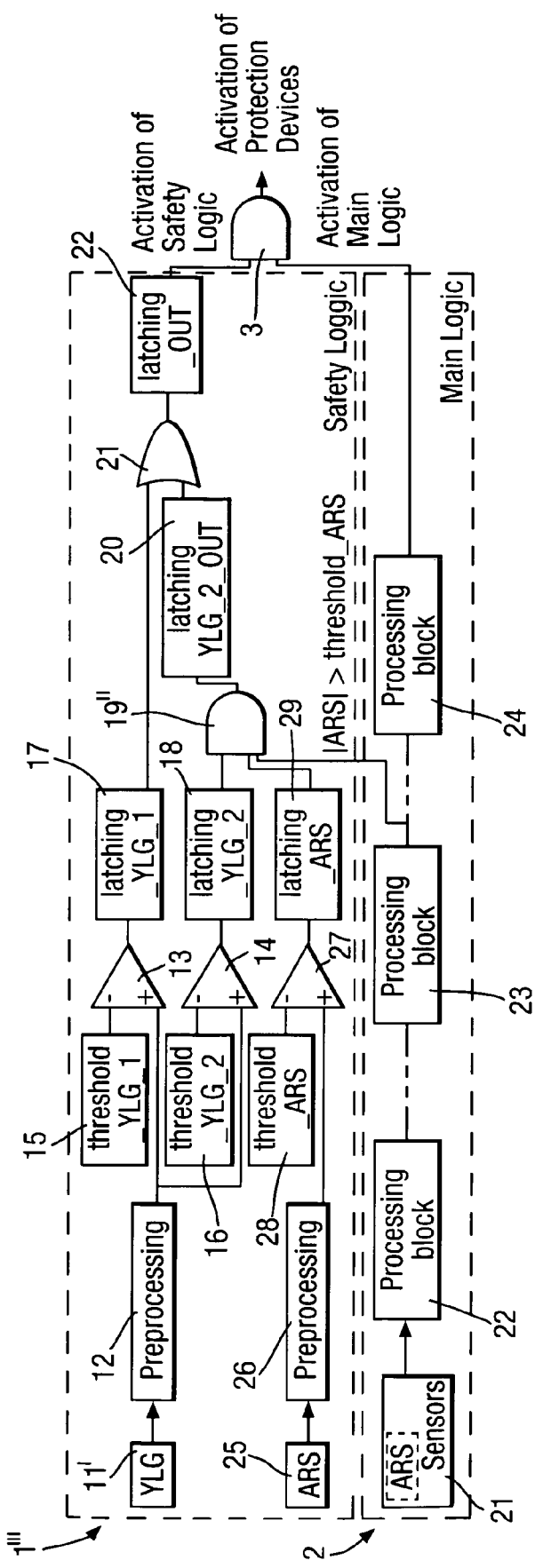
FIG. 4 is a block and circuit diagram of a yet another embodiment of a rollover detection system.

FIG. 4 presents yet another embodiment of the safety logic 1'''. Unlike the logic in FIG. 2, there is one more additional activation signal generated by the main logic 2, which is also a signal of exceeding roll rate, but obtained on the basis of indications from vehicle roll rate sensor of the main logic. A doubling the sensors allows to achieve higher reliability of operation—while exceeding the threshold value "threshold_YLG_2", it is necessary to confirm dangerous situation by two independent vehicle roll rate sensors.

It is obvious that embodiments of safety logic presented above may be implemented as electronic circuits provided with suitable comparing, filtering, or summing elements, as well as a software by the suitable algorithm of individual electronic control unit (ECU).

It is preferably to separate the main logic from the safety logic through using two independent ECUs, what provides considerable independence of the system. Main logic and the additional safety logic may also be implemented separately in two individual microcontrollers (preferably of different types), that are placed in one ECU unit.

Figure 5:
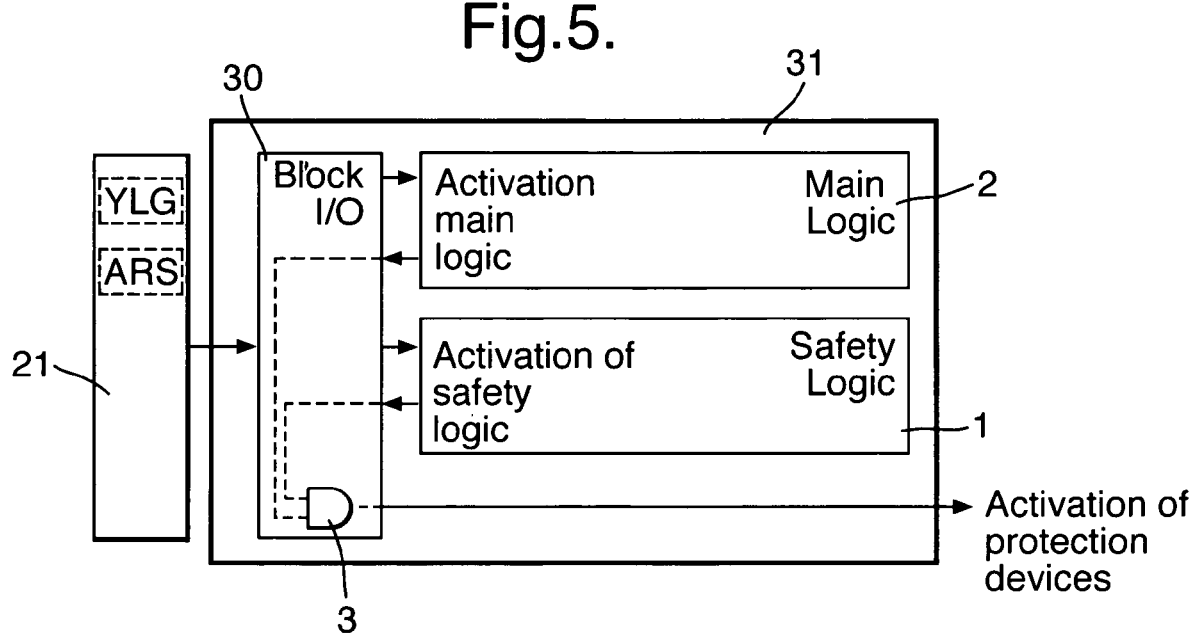
FIG. 5 is a block and circuit diagram of an implementation of a rollover detection system.

An example of such implementation is presented in FIG. 5, where two microcontrollers are employed within one ECU unit 31: the microcontroller of the main unit 2 and the microcontroller of the safety unit 1. Both units are connected to the I/O block 30, through which they receive appropriate sensor signals. The output of the main logic 2 is coupled with the input of the AND gate 3 that is built in block 30. The second input of the gate 3 is coupled with the output of the safety logic 1. Activation of both logics is required to activate suitable protection device, e.g. an airbag.

The safety logic according to the present invention is a very simple, economical and elastic solution, owing to many calibration parameters. It is activated substantially in situations, when the probability of vehicle rollover is significant. During normal driving conditions, for example driving on roughness roads, turns, driving in a straight line or driving uphill, it remains inactive.

The invention claimed is:

1. A vehicle rollover detection system for deploying an occupant protection device in response to a vehicle rollover event, said vehicle rollover detection system comprising:
   a lateral acceleration sensor for providing a vehicle lateral acceleration signal;
   a roll rate sensor for providing a vehicle roll rate signal; and
   a processor adapted to receive the vehicle lateral acceleration signal and the vehicle roll rate signal, said processor comprising
   a main logic configured to provide a main logic activation signal indicative of a vehicle rollover event, and
   a safety logic for generating a safety logic activation signal in response to (a) a determination that the vehicle lateral acceleration signal exceeds a predefined first threshold value; or (b) a determination that the vehicle lateral acceleration signal exceeds a predefined second threshold value that is less than the predefined first threshold value and that the vehicle roll rate signal exceeds a predefined roll rate threshold value,
   said processor being configured to provide an occupant protection device deployment signal in response to the presence of both the main logic activation signal and the safety logic activation signal.

2. The vehicle rollover detection system of claim 1, wherein the main logic is adapted to provide an additional safety logic input signal.

3. The vehicle rollover detection system of claim 2, wherein the additional safety logic input signal is present when the vehicle roll rate signal exceeds the predefined roll rate threshold value.

4. The vehicle rollover detection system of claim 3, wherein the additional safety logic input signal is present when a vehicle linear velocity exceeds a predefined linear velocity threshold value.

5. The vehicle rollover detection system of claim 2, wherein the additional safety logic input signal is present when a vehicle roll angle exceeds a predefined roll angle threshold value.

6. The vehicle rollover detection system of claim 1, wherein the additional safety logic input signal is present when the vehicle roll rate signal exceeds the predefined roll rate threshold value.

7. The vehicle rollover detection system of claim 1, wherein the processor further comprises a main logic that provides a main logic activation signal, and wherein the system provides an occupant protection device deployment signal based upon the main logic activation signal and the safety logic activation signal.

8. The vehicle rollover detection system of claim 7, wherein the safety logic activation signal is sustained for a predefined period sufficient to allow processing of the main logic to output the main logic activation signal in response to the vehicle roll over event.

9. A method of determining a vehicle rollover event for controlling the deployment of an occupant protection device, comprising:
   measuring a vehicle lateral acceleration and providing a vehicle lateral acceleration signal indicative of the vehicle lateral acceleration;
   measuring a vehicle roll rate and providing a vehicle roll rate signal indicative of the vehicle roll rate;
   generating a main logic activation signal indicative of the vehicle rollover event;
   generating an a safety logic activation signal in response to a determination that the vehicle lateral acceleration signal exceeds a predefined first threshold value or, that the vehicle lateral acceleration signal exceeds a predefined second threshold value that is lower than the predefined first threshold value and the vehicle roll rate signal exceeds a predefined roll rate threshold value; and deploying the occupant protection device in response to the presence of both the main logic activation signal and the safety logic activation signal.

10. The method of claim 9 further comprising:

providing an additional safety logic input when the vehicle roll rate signal exceeds the predefined roll rate threshold.

11. The method of claim 10 further comprising providing the additional safety logic input in response to a determination that a vehicle linear velocity exceeds a predetermined linear velocity threshold.

12. The method of claim 10 further comprising:

measuring a vehicle roll angle; and providing the additional safety logic input if the vehicle roll angle exceeds a predetermined roll angle threshold.

13. The method of claim 12 further comprising:

determining the vehicle roll angle based on the vehicle roll rate signal.

14. The method of claim 10 further comprising:

sustaining the safety logic activation signal for a predetermined period effective to allow processing of the main logic.

* * * * *